UNITED STATES PATENT OFFICE.

NELSON B. ARNOLD, OF NEW YORK, N. Y.

CONCRETE BINDER AND PRESERVATIVE.

1,047,481.  Specification of Letters Patent.  Patented Dec. 17, 1912.

No Drawing.  Application filed June 13, 1911.  Serial No. 632,940.

*To all whom it may concern:*

Be it known that I, NELSON B. ARNOLD, a citizen of the United States, and residing in the borough of Brooklyn, Kings county, city and State of New York, have invented certain new and useful Improvements in Concrete Binders and Preservatives.

My invention consists of a composition to be used on cement or concrete constructions to prevent "dusting" or surface disintegration which are usually caused by defective settings.

I have found that compositions containing acid resins do not answer the purpose satisfactorily as disintegration occurs from the action between the alkaline cement and the acids in the varnish and to that end I use neutral resins and a strong alkali to neutralize any small quantity of acid that might exist in any of the constituent parts.

The composition for my binder and preservative consists of a vehicle and pigments in the following proportions:

| | |
|---|---|
| Pigments | 56 parts |
| Vehicle | 44 parts |

The proportion of pigments constituting the 56 parts of the composition is as follows:

| | |
|---|---|
| Barium sulfate | 48% |
| Zinc sulfid | 18% |
| Zinc oxid | 13% |
| Calcium sulfate | 7% |
| Calcium carbonate | 11% |
| Tints | 3% |
| | 100% |

In the vehicle the constituents are in the following proportions:

| | |
|---|---|
| Non-acid East Indian resins | 2% |
| Rosin | 10% |
| Thinners | 49% |
| Oil | 37% |
| Driers | 1% |
| Lime | 1% |
| | 100% |

The thinners may consist of turpentine, benzin or turpentine substitute, the oil may be either China wood oil or linseed, the driers may be lead or manganese oxids, and the lime is for the purpose of neutralizing any acid in the composition.

In practice I apply one or more coats of the vehicle set forth above to the cement or concrete to be treated. This will thoroughly dry, in from twenty-four to forty-eight hours. When the surface is dry one or more coats of the composition in the proportion of 56 parts of the pigments to 44 parts of the vehicle is applied and thereafter there will be no "dusting" or disintegration of the surface.

I am aware that a composition containing highly acid resins has been used for the same purpose but my mixture has a very low acid figure and I am not aware that all the ingredients thereof have been used together.

I claim:

1. The herein described composition of matter, consisting of non-acid East Indian resins, rosin, thinners, oil, driers, lime, barium sulfate, zinc sulfid, zinc oxid, calcium sulfid, calcium carbonate and tints.

2. The herein described composition of matter for binding and preserving concrete or cement consisting of .88% non-acid East Indian resins, 4.40% rosin, 21.56% thinners, 16.28% oil, .44% driers, .44% lime, 26.88% barium sulfate, 10.08% zinc sulfid, 7.28% zinc oxid, 3.92% calcium sulfate, 6.16% calcium carbonate and 1.68% tints.

In witness whereof, I have hereunto set my hand this 9″ day of June, 1911.

NELSON B. ARNOLD.

Witnesses:
 THEODORE T. LINES,
 WILLIAM W. KAMIEN.